United States Patent [19]

Yasumura et al.

[11] Patent Number: 5,010,416
[45] Date of Patent: Apr. 23, 1991

[54] COLOR VIDEO SIGNAL REPRODUCING APPARATUS

[75] Inventors: Hiroto Yasumura; Masahide Hirasawa; Minoru Noji, all of Kanagawa, Japan; Susumu Kozuki, Tokyo; Koji Takahashi; Katsuji Yoshimura, both of Kanagawa, all of Japan

[73] Assignee: Canon Kabushiki Kaisha, Tokyo, Japan

[21] Appl. No.: 420,764

[22] Filed: Oct. 11, 1989

Related U.S. Application Data

[62] Division of Ser. No. 39,085, Apr. 16, 1987, Pat. No. 4,896,219.

[30] Foreign Application Priority Data

| Apr. 23, 1986 | [JP] | Japan | 61-093978 |
| Apr. 23, 1986 | [JP] | Japan | 61-093979 |
| May 12, 1986 | [JP] | Japan | 61-107983 |
| May 12, 1986 | [JP] | Japan | 61-107984 |
| May 12, 1986 | [JP] | Japan | 61-107986 |

[51] Int. Cl.$^5$ .............................................. H04N 9/88
[52] U.S. Cl. .................................. 358/314; 360/38.1
[58] Field of Search .............. 358/314, 336, 37, 40, 358/327; 360/38.1

[56] References Cited

U.S. PATENT DOCUMENTS 4,689,695  8/1987  Urata ........................... 358/314
4,896,219  1/1990  Yasumura et al. ............ 358/327

Primary Examiner—W. B. Perkey
Attorney, Agent, or Firm—Robin, Blecker, Daley & Driscoll

[57] ABSTRACT

A color video signal reproducing apparatus for reproducing a color video signal from a recording medium on which at least luminance and chrominance signals are recorded in the form of a multiplexed signal is arranged to reproduce the multiplexed signal from the recording medium; to separate the luminance and chrominance signals from the reproduced multiplexed signal; and to demodulate and convert the chrominace signal into a plurality of different base-band signals. This arrangement permits a correcting operation to be accomplished on the color information of the reproduced color video signal without deteriorating the color information with simple structural arrangement.

4 Claims, 7 Drawing Sheets

COLOR VIDEO SIGNAL REPRODUCING APPARATUS

This is a division of application Ser. No. 039,085, filed Apr. 16, 1987, now U.S. Pat. No. 4,896,219.

BACKGROUND OF THE INVENTION

1. Field of the Invention

This invention relates to a color video signal reproducing apparatus for reproducing a color video signal from a recording medium.

2. Description of the Related Art

In the conventional apparatus for recording and reproducing a color video signal, such as a video tape recorder of the kind equipped with a camera (hereinafter referred to as a camera-combined type VTR) which is capable of performing a reproducing operation as well as recording, a recording operation is arranged to be performed in the following manner: A luminance signal Y and color difference signals (R-Y and B-Y) are obtained from R (red), G (green) and B (blue) signals by means of a matrix circuit. The luminance signal Y is frequency modulated after a pre-emphasis process. Further, the color difference signals R-Y and B-Y are quadrature two-phase modulated into a carrier chrominance signal (hereinafter referred to as a chrominance signal). The chrominance signal is then frequency converted into a low-band chrominance signal. The luminance signal which is frequency modulated and the chrominance signal which is converted to a lower frequency band are then frequency multiplexed into a composite recording signal. The composite signal is recorded on a magnetic tape by a rotary magnetic head.

In reproduction, low-pass and band-pass filters are operated to separate the frequency modulated luminance signal and the low-band converted chrominance signal from each other. The frequency modulated luminance signal is demodulated back into the original luminance signal and the low-band converted chrominance signal is frequency converted into the original chrominance signal. The luminance and chrominance signals are multiplexed and are produced as a reproduced composite video signal.

Any drop-out that occurs in the reproduced composite video signal has been arranged to be compensated solely for the reproduced luminance signal on the side of the reproduction system of the VTR. FIG. 1 of the accompanying drawings shows by way of example and in outline the arrangement of the reproduction system of the conventional VTR which is provided with a circuit for correcting the drop-out of a luminance signal.

Referring to FIG. 1, rotary magnetic heads 1a and 1b reproduce a composite signal from a magnetic tape which is not shown. The reproduced composite signal is supplied to a head change-over switch 2. The switch 2 is arranged to have its connecting position switched from one side A over to another side B by means of a head change-over pulse which is generated according to the cycle of rotation of the magnetic heads 1a and 1b. The composite signal reproduced by the magnetic heads 1a and 1b are supplied to a reproduction amplifier 3 via the switch 2. If, for example, the signal corresponds to a television signal of the NTSC system, the position of the switch 2 is arranged to be changed every 1/60 sec.

The amplifier 3 amplifies the reproduced composite signal. The amplified signal is supplied to a high-pass filter (HPF) 4; a low-pass filter (LPF) 5 and a known frequency control (AFC) circuit 6. The HPF 4 separates a reproduced luminance signal and the LPF 5 a reproduced chrominance signal respectively.

The reproduced luminance signal is demodulated by a frequency demodulation circuit 7. The demodulated luminance signal is supplied to one horizontal scanning period (1H) delay circuit 9 and a mixer 10 via a change-over switch 8 which is normally in connection with one side L thereof. Meanwhile, the reproduced chrominance signal which is in a state of having been converted to a low frequency band is brought back to the original chrominance signal form by a known frequency conversion circuit 11 and a band-pass filter (BPF) 12. In other words, it is brought back into a signal modulated with a subcarrier frequency fsc (3.58 MHz). The AFC circuit 6, a phase control (APC) circuit 13, an auxiliary frequency conversion circuit 14 and a reference signal generating circuit 15 are arranged in a known manner to generate a time base corrected chrominance signal with a frequency converting process performed at the above stated frequency conversion circuit 11 in a known manner.

The luminance signal and the chrominance signal which have been processed in the above stated manner are added up at the mixer 10 into a reproduced composite video signal. In the event of occurrence of a drop-out, the conventional apparatus operates as described below:

When a drop-out occurs in the reproduced composite video signal in the arrangement shown in FIG. 1, the reproduced luminance signal at that part brings about a sudden change in the envelope of the signal. When the level change of the envelope is detected, a drop-out detection circuit 16 produces and supplies a drop-out detection pulse to the change-over switch 8.

Then, the change-over switch 8 is connected to its side H and remains in that connecting position over one horizontal scanning period (hereinafter referred to as 1-H) after receipt of this drop-out detection pulse. The luminance signal is thus delayed by a 1-H delay circuit 9 as much as one horizontal scanning period (1-H). As a result, the luminance signal which is obtained one horizontal scanning period before and is thus delayed is supplied to the mixer 10 via the switch 8. The luminance signal of the part where the drop-out has occurred is thus compensated for by the luminance signal which is obtained one horizontal scanning period before.

While the luminance signal has been thus arranged to be compensable for a drop-out, the chrominance signal has never been compensated for the drop-out, because:

In accordance with the conventional method of compensating for a drop-out, the drop-out signal portion is compensated by interpolation with another signal portion. This method necessitates use of a 1-H delay circuit or a 1-frame period delay circuit. However, as well known, the chrominance signal is modulated with the subcarrier frequency fsc which is in an interleaving relation to the repetition frequency fH of the horizontal scanning line. Therefore, a mere attempt to compensate the chrominance signal for a drop-out portion thereof simply with a 1-H period delayed chrominance signal portion would affect the continuity of the subcarrier fsc without some additional process of inverting the phase of the chrominance signal or the like. Besides, even a slight deviation of the timing of a delay action would cause a change in hue and thus would result in a completely different chrominance signal when the signal is reproduced.

Because of the above stated reason, unlike the luminance signal, the chrominance signal is hardly compensable for a drop-out by means of a delay circuit. As a result, no drop-out compensation has been made for a chrominance signal.

Further, the reproduced composite signal correcting processes to be carried out by the VTR in reproducing a video signal from a magnetic tape include a process of removing noises mixed in the reproduced composite video signal. The noise removing process has been accomplished only for a reproduced luminance signal and in a manner as described below:

FIG. 2 shows in outline and by way of example the arrangement of the reproduction system of a VTR which is provided with a noise removing circuit for removal of noises from the luminance signal. In FIG. 2, the parts which are the same or equivalent to those shown in FIG. 1 are indicated by the same reference numerals as FIG. 1.

Referring to FIG. 2, a reproduced composite video signal which is reproduced by rotary heads 1a and 1b from a magnetic tape (not shown) is supplied to a changeover switch 2. The connecting position of the switch 2 is arranged to be alternately shiftable between two sides A and B of the switch 2 by a head changeover pulse according to the cycle of rotation of the magnetic heads 1a and 1b. A composite video signal which is reproduced by the rotary magnetic heads 1a and 1b is supplied via the switch 2 to a reproduction amplifier 3. The switch 2 is arranged to have its position changed, for example, every 1/60 sec in the case of a video signal corresponding to the television signal of the NTSC system.

The signal amplified by the amplifier 3 is supplied to an HPF 4, an LPF 5 and an AFC circuit 6. A reproduced luminance signal is separated by the HPF 4 while a reproduced chrominance signal is separated by the LPF 5. The reproduced luminance signal is then demodulated by a frequency demodulation circuit 7. The demodulated luminance signal is supplied to a correlation detection circuit 17 and subtracters 18 and 19.

Meanwhile, a reproduced chrominance signal which is included in the composite signal is in a state of having been converted to a low band is brought back to its original chrominance signal form or converted with a subcarrier fsc (3.58 MHz) through a known frequency conversion circuit 11 and a known BPF 12. The reproduced chrominance signal which is thus processed back to its original state is supplied to a mixer 20. An AFC circuit 6, an APC circuit 13, an auxiliary frequency conversion circuit 14 and a reference signal generating circuit 15 are arranged in a known manner to give a time base corrected chrominance signal through a frequency converting process performed at the frequency conversion circuit 11.

A noise removing operation on the luminance signal demodulated by the frequency demodulation circuit 7 is as follows: The frequency demodulated luminance signal is supplied to a correlation detection circuit 17 which is included in the arrangement shown in FIG. 2. The circuit 17 is arranged to perform a computing operation for determining a correlation between the luminance signal and a luminance signal portion which is obtained one horizontal period (1-H) before and is delayed 1-H by a one-horizontal scanning period (1-H) delay circuit 21 after removal of noises. A setting value of a coefficient to be integrated at a coefficient integrating circuit 22 is then controlled according to the result of the above stated computing operation. In other words, the correlation detection circuit 17 is arranged to set a coefficient value $\alpha$ within a range of $0 \leq \alpha \leq 1$ to have it set at a value closer to $\alpha = 1$ or closer to $\alpha = 0$ according as the correlation is stronger or weaker. In the case where the correlation is determined to be none, the setting value is $\alpha = 0$.

After determination of the correlation between the present luminance signal portion and the previous luminance signal portion preceding by 1-H and after setting of the coefficient $\alpha$, the luminance signal portion delayed by the 1-H delay circuit 21 and the present luminance signal portion are subjected to a subtracting operation performed by the subtracter 18. A difference signal thus obtained is supplied to the above stated coefficient integrating circuit 22. The coefficient $\alpha$ which is set in the above stated manner is then integrated by the circuit 22. The result of the integrating operation is supplied to another subtracter 19.

Meanwhile, the present portion of the reproduced and frequency demodulated luminance signal is supplied to the subtracter 19. The subtracter 19 subtracts the output of the coefficient integrating circuit 22 from the present portion of the luminance signal.

In other words, the difference signal produced from the subtracter 18 can be assumed to have a noise component in the event of strong correlation between the present luminance signal and the 1-H delayed preceding luminance signal portion. In that event, therefore, the coefficient $\alpha$ is set close to 1 to have the difference signal of the subtracter 18 subtracted almost in its entirety from the present luminance signal. In case of weak correlation, the difference signal produced from the subtracter 18 is assumed to have little noise component therein. In this case, therefore, the coefficient $\alpha$ is set at a value closer to 0 and the present luminance signal is allowed to be produced with little of the difference signal of the subtracter 18 subtracted from the present luminance signal. With the noise component thus removed therefrom, the luminance signal is supplied to the 1-H delay circuit 21 and the mixer 20. Then, at the delay circuit 21, the signal is delayed for 1-H for detection of the above stated correlation and for noise removal. At the mixer 20, the luminance signal from which noises are removed and the chrominance signal which has been frequency converted in the above stated manner are multiplexed and are produced as a reproduced composite video signal.

While noises have been removed from the luminance signal in the manner described above, this noise removing operation has not been performed on the chrominance signal because: The noise removing operation is performed by using a previous signal correlating with a present signal. The conventional method necessitates use of a 1-H delay circuit or a 1-frame period delay circuit. However, as well known, the chrominance signal is modulated by the subcarrier fsc which is in an interleaving relation to the repeating frequency fH of horizontal scanning lines. Therefore, mere arrangement to perform the above stated noise removing operation, by simply performing a subtracting or adding operation on the present and previous chrominance signal portions would impair the continuity of the subcarrier fsc unless some phase inverting process or the like is performed as the chrominance signal has its phase inverted every 1-H period. Further, any deviation of signal phase due to inconstancy of delay time of the delay circuit results in a change of hue. Then, it becomes impossible to have color information reproduced with fidelity.

It has been thus extremely difficult, unlike in the case of the luminance signal, to remove noises from the chrominance signal by the method of using a delay circuit for utilization of the correlativity of signals. Therefore, the above stated noise removing process has not been applied to the chrominance signal. Any other correction process that would vary the signal phase besides the noise removing process also has not been performed.

In accordance with the conventional method as described in the foregoing, correction of color information during reproduction must be performed in the form of the chrominance signal. However, the chrominance signal has some hue information included also in the phase thereof. It is, therefore, difficult to carry out correction while retaining the continuity of the phase variations of the chrominance signal. Correction such as compensation for a drop-out of the signal and noise removal by means of a feedback type noise removing circuit cannot be carried out by any correcting method that disturbs the phase relation. The deterioration of reproduced color information such as inConstant colors thus has been left uncorrected because of the problem described.

SUMMARY OF THE INVENTION

This invention is directed to the solution of the above stated problem of the prior art.

It is therefore an object of this invention to provide an apparatus which is capable of correcting a reproduced color video signal with simple arrangement and without deteriorating color information.

Under this object, a color video signal reproducing apparatus arranged as an embodiment of this invention to reproduce a color video signal from a recording medium on which at least a luminance signal and a chrominance signal are recorded together in the form of a multiplexed signal comprises: reproducing means for reproducing the multiplexed signal from the recording medium; separating means arranged to separate the luminance signal and the chrominance signal from the multiplexed signal reproduced by the reproducing means and to produce the separated signals respectively; and demodulating means arranged to demodulate the chrominance signal separated by the separating means into base-band signals and to produce these base-band signals respectively.

It is another object of this invention to reduce the size and cost of an apparatus by arranging a component part of the apparatus to perform combined functions.

Under that object, a color video signal reproducing apparatus arranged as an embodiment of this invention to reproduce a color video signal from a recording medium on which at least a luminance signal and a low-zone converted chrominance signal are recorded in the form of a multiplexed signal comprises: reproducing means for reproducing the multiplexed signal from the recording medium; separating means arranged to separate the luminance signal and the low-band converted chrominance signal from the multiplexed signal reproduced by the reproducing means and to produce the separated signals respectively; reference signal generating means for generating a reference signal; first conversion means arranged to convert the low-band converted chrominance signal separated by the separating means into a different frequency band by using the reference signal of the reference signal generating means and to produce the converted signal; and second conversion means arranged to convert, using the reference signal of the reference signal generating means, the signal obtained from the first conversion means into a plurality of different base-band signals and to produce the base-band signals.

It is a further object of this invention to provide a color video signal reproducing apparatus which is capable of reproducing a color video signal with little deterioration by correcting color information according to the condition of reproduced luminance information.

Under the above stated object, a color video signal reproducing apparatus arranged as an embodiment of this invention to reproduce a color video signal from a recording medium on which at least a luminance signal and a chrominance signal are recorded in the form of a multiplex signal comprises: reproducing means for reproducing the multiplex signal from the recording medium; separating means arranged to separate the luminance signal and the chrominance signal from the multiplex signal reproduced by the reproducing means and to produce the separated signals respectively; signal forming means arranged to form a plurality of different base-band signals by using the chrominance signal separated by the separating means and to produce the base-band signals; signal state detecting means for detecting the state of signals relative to the luminance signal separated by the separating means; and correcting means for correcting the plurality of different base-band signals obtained from the signal forming means according to the state detected by the signal state detecting means.

It is a further object of this invention to provide a color video signal reproducing apparatus which is capable of correcting a reproduced color video signal without deteriorating it by determining the degree and manner in which color or chrominance information is to be corrected according to the degree and manner in which reproduced luminance information is corrected and by correcting the chrominance information according to the result of determination.

Under that object, a color video signal reproducing apparatus arranged as an embodiment of this invention to reproduce a color video signal from a recording medium on which at least a luminance signal and a chrominance signal are recorded in the form of a multiplex signal comprises: reproducing means for reproducing the multiplex signal from the recording medium; separating means arranged to separate the luminance signal and chrominance signal from the multiplex signal reproduced by the reproducing means and to produce the separated signals respectively; signal forming means arranged to form a plurality of different base-band signals by using at least the chrominance signal separated by the separating means and to produce the base-band signals thus formed; first correcting means for correcting the luminance signal separated by the separating means; and second correcting means for correcting, according to the degree of correction made by the first correcting means, the plurality of base-band signals obtained from the signal forming means.

These and further objects and features of this invention will become apparent from the following detailed description of embodiments thereof taken in connection with the accompanying drawings.

DETAILED DESCRIPTION OF PREFERRED EMBODIMENTS

Figure 1:
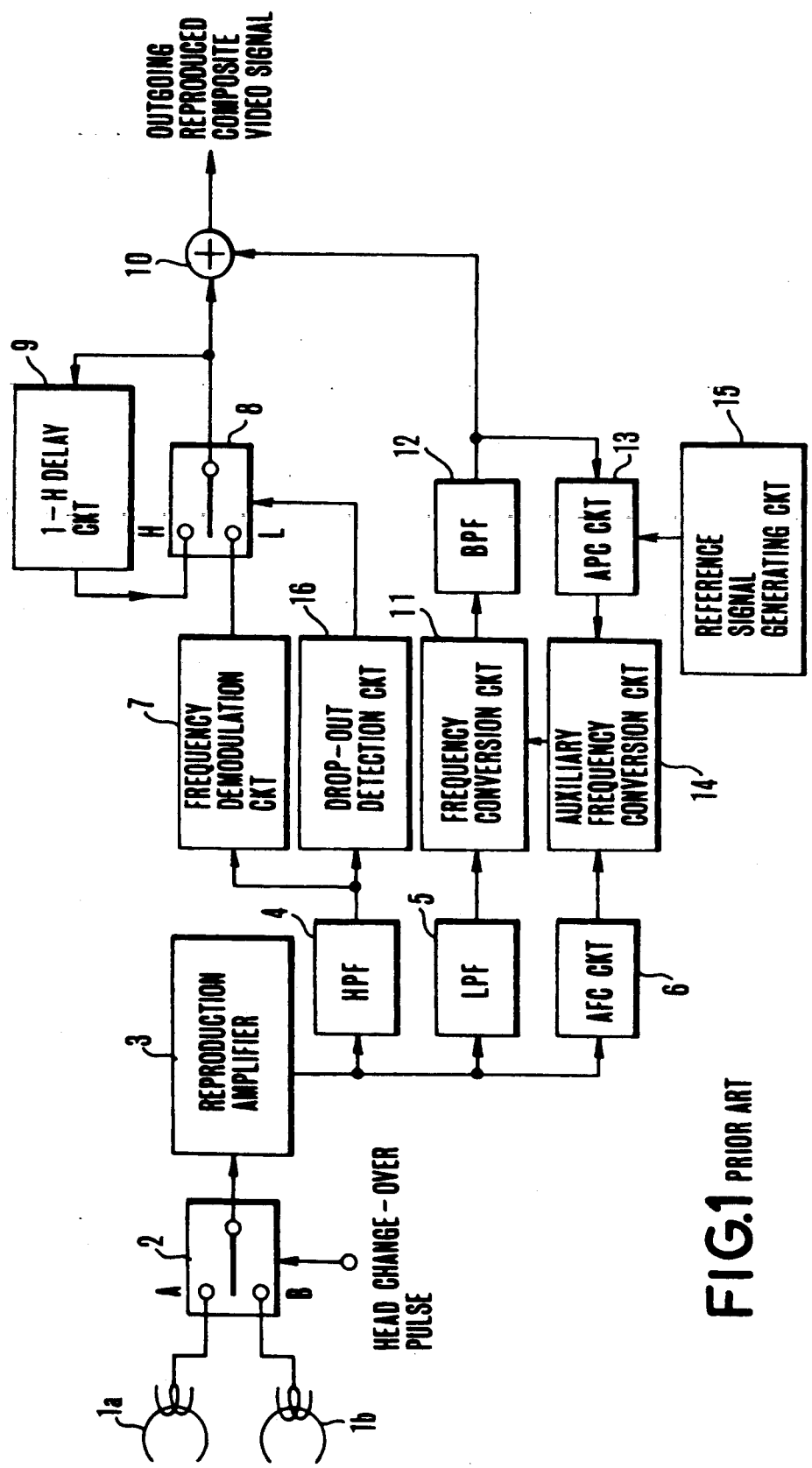
FIG. 1 is a block diagram showing in outline and by way of example the arrangement of the reproduction system of the conventional VTR which is provided with a luminance signal drop-out correction circuit.
Figure 3:
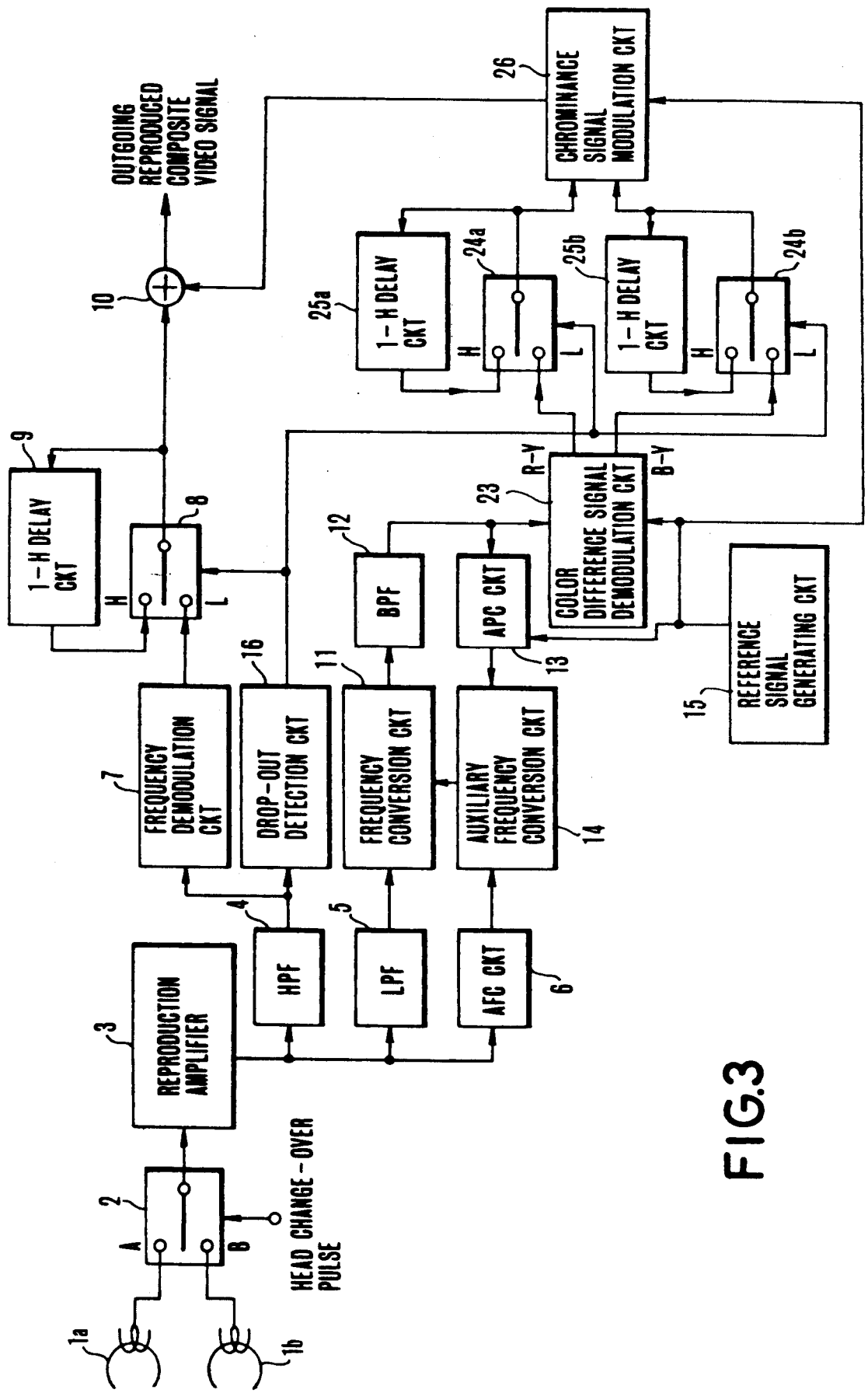
FIG. 3 is a block diagram showing in outline the arrangement of the reproduction system of a VTR which is provided with a drop-out compensation circuit and is arranged as a first embodiment of this invention.

FIG. 3 is a diagram showing in outline the arrangement of the reproduction system of a VTR having a drop-out compensation circuit to which this invention is applied as a first example of embodiment of this invention. In FIG. 3, the same reference numerals as those of FIG. 1 are used for denoting like parts.

Figure 2:
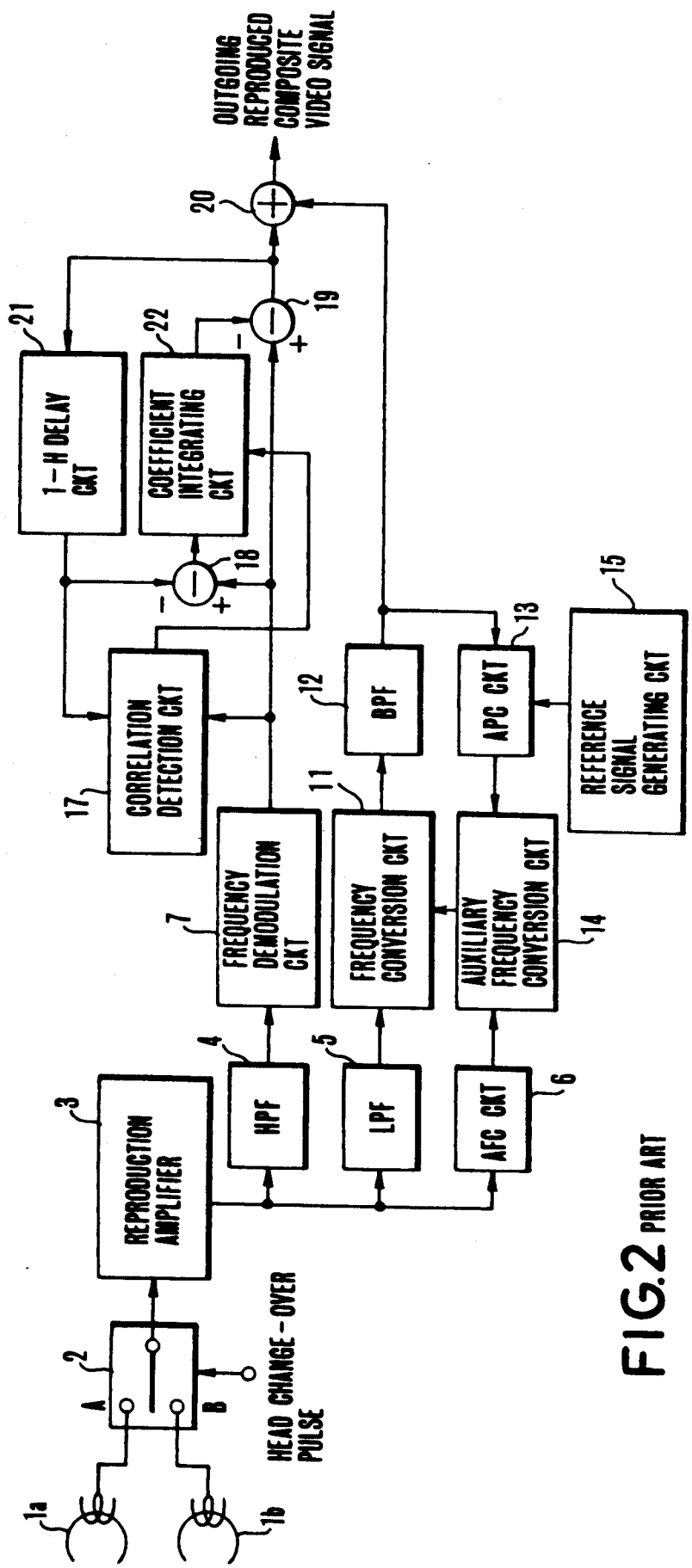
FIG. 2 is a block diagram showing in outline and by way of example the arrangement of the reproduction system of the conventional VTR which is provided with a noise removing circuit.

Referring to FIG. 3, a composite signal which is reproduced from a magnetic tape (not shown) by rotary heads 1a and 1b is supplied via a change-over switch 2 to a reproduction amplifier 3 in the same manner as in the case of FIG. 2. The reproduced composite signal is amplified by the amplifier 3. A reproduced luminance signal is then separated from the composite signal by an HPF 4. The luminance signal thus separated is supplied to a drop-out detection circuit 16 and, at the same time, is demodulated by a frequency demodulation circuit 7. The demodulated luminance signal is then supplied to a change-over switch 8. Meanwhile, a reproduced chrominance signal which is in a state of having been converted to a low frequency band is separed from the reproduced composite signal by an LPF 5. The reproduced chrominance signal thus separated is then brought back into a normal chrominance signal in the same manner as in the case of FIG. 1. The chrominance signal then undergoes a band restricting process through a BPF 12 before it is supplied to a color difference signal demodulation circuit 23.

Meanwhile, a reference signal generating circuit 15 is arranged to produce a reference signal fc which is of the same frequency as that of a subcarrier (3.58 MHz in the case of a signal corresponding to a television signal of the NTSC system, for example) and is supplied to an APC circuit 13.

The chrominance signal supplied to the color difference signal demodulation circuit 23 has therein color difference signals R-Y and B-Y quadrature two-phase modulated by the subcarrier fsc. Therefore, the color difference signal demodulation circuit 23 demodulates the chrominance signal into the color difference signals R-Y and B-Y on the basis of the reference signal fc which is supplied from the reference signal generating circuit 15 and has the same frequency as that of the subcarrier fsc. The color difference signals are then supplied to change-over switches 24a and 24b.

The change-over switches 8, 24a and 24b are normally connected to their sides L shown in FIG. 3. Under this condition, the luminance signal is supplied to a mixer 10 via the change-over switch 8 while the color difference signals R-Y and B-Y are supplied to a chrominance signal demodulation circuit 26 via the switches 24a and 24b.

In addition to the color difference signals R-Y and B-Y, the reference signal fc generated by the reference signal generating circuit 15 is also supplied to the chrominance signal modulation circuit 26. The circuit 26 modulates the color difference signals R-Y and B-Y back into the form of the original chrominance signal according to the reference signal fc thus supplied. A chrominance signal thus obtained from the circuit 26 is supplied to the mixer 10 to be mixed with the above stated luminance signal. The mixer 10 then produces an outgoing reproduced composite video signal.

The luminance signal which is produced from the change-over switch 8 is supplied to a 1-H delay circuit 9 as well as to the mixer 10. The luminance signal is delayed for one horizontal scanning period (1-H) by the circuit 9. Then, a 1-H delayed luminance signal portion which is thus obtained is supplied to one side H of the change-over switch 8. The color difference signals R-Y and B-Y which are produced from the change-over switches 24a and 24b are supplied to the chrominance signal modulation circuit 26. At the same time, the signals R-Y and B-Y are delayed for one horizontal scanning period (1-H) respectively, the signal R-Y by a 1-H delay circuit 25a and the signal B-Y by another 1-H delay circuit 25b. The output of the 1-H delay circuit 25a is supplied to one side H of the change-over switch 24a and that of the 1-H delay circuit 25b to one side H of the switch 24b.

In the event of occurrence of a drop-out, the circuit arranged as shown in FIG. 3 operates as follows:

The reproduced luminance signal which is separated from the reproduced composite signal by means of the HPF 4 is supplied to a drop-out detection circuit 16. Since the reproduced luminance signal is in a frequency modulated state, in the event of occurrence of a drop-out, the signal portion having the drop-out shows an abrupt level change of the envelope thereof. When such a change is detected in the envelope at the drop-put detection circuit 16, the circuit 16 produces and supplies high level change-over pulses to the change-over switches 8, 24a and 24b until disappearance of the change on the assumption of that a drop-out has occurred in the luminance signal. Each of these switches 8, 24a and 24b then shifts and keeps its connecting position on its side H as long as the high level pulse input continues.

The change-over switches 8, 24a and 24b are thus arranged to produce, for the duration of the drop-out, the above stated signals which are obtained one H before and delayed by the 1-H delay circuits 9, 25a and 25b respectively. Any signal portion having a drop-out is thus arranged to be produced in a state of being interpolated with a signal portion obtained one H before.

Each signal portion which is thus compensated for is processed in the same way as the normal reproduction process and is produced from the mixer 10 as an outgoing reproduced composite video signal.

As described above, the embodiment is capable of easily performing a drop-out compensating action not only for the luminance signal but also for the chrominance signal by converting the reproduced chrominance signal into color difference signals which are not readily affected by phase variations.

In the embodiment, drop-out occurrence is arranged to be detected by the drop-out detection circuit only for the reproduced luminance signal and the signals processed through the delay circuits are arranged to be used according to the drop-out detection. This arrangement effectively solves a problem which arises if drop-out detection circuits are provided separately for the reproduced luminance signal and the color difference signals R-Y and B-Y. In other words, in case that a drop-out detection circuit is provided for each of the reproduced luminance signals and signals R-Y and B-Y and that their delay circuits are arranged to be separately controlled, a drop-out might not be detected by all of the detection circuits if any of the drop-out detection circuits fails to adequately operate at the time of occurrence of the drop-out. In that event, a signal which is compensated for the drop-out and another signal which is not compensated for the drop-out are concurrently generated with some excessive phase deviation that makes matching between them impossible. Such a condition would result in the deterioration of the outgoing reproduced composite video signal. In cases where each of the signals is to be provided with a drop-out detection circuit separately from other signals, the above stated problem can be solved by generating a control pulse which causes all the drop-out detection circuits to perform a drop-out compensating or correcting process when any one of them detects a drop-out.

In the case of this embodiment, the drop-out compensating action is arranged to be performed by means of the 1-H delay circuits. This arrangement is on the assumption that a signal portion obtained one horizontal scanning period before the present signal portion has the highest degree of correlativity with the present signal portion. However, the 1-H delay circuit may be replaced with a one-field or one-frame period delay circuit. It is also possible, for an improved picture quality after the drop-out compensation, to have the delaying degree of the delay circuit arranged to be controlled according to the correlativity of the signals.

The arrangement of this embodiment to make the drop-out compensation by demodulating the chrominance signal into color difference signals may be changed to some other different arrangement. For example, the chrominance signal may be demodulated to some other base-band signals such as R, G and B signals before carrying out drop-out correction.

Figure 4:
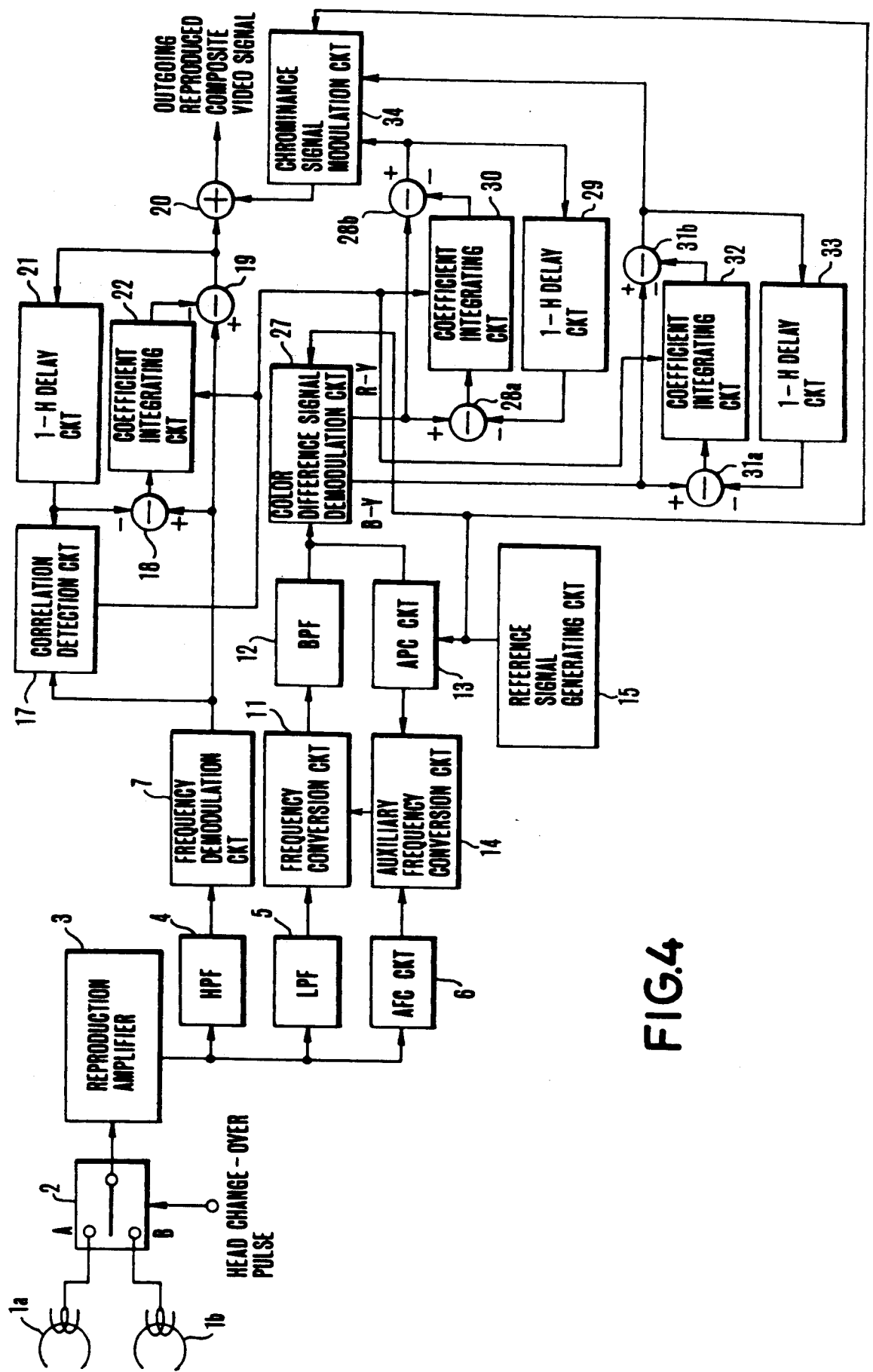
FIG. 4 is a block diagram showing in outline the arrangement of the reproduction system of a VTR which is provided with a noise removing circuit and is arranged as a second embodiment of this invention.

FIG. 4 shows in outline the arrangement of the reproduction system of a VTR which is provided with a noise removing circuit and is arranged as a second embodiment of this invention. The parts similar to those of FIG. 2 are indicated by the same reference numerals.

Referring to FIG. 4, a composite signal which is reproduced from a magnetic tape (not shown) by rotary magnetic heads 1a and 1b is supplied to a reproduction amplifier 3 via a change-over switch 2 in the same manner as in the case of FIG. 2. The reproduced composite signal is thus amplified. A reproduced luminance signal is separated by an HPF 4 from the composite signal. The luminance signal is then demodulated at a frequency demodulation circuit 7. The demodulated luminance signal is supplied to a correlation detection circuit 17 and subtracters 18 and 19. Then, in the same manner as in the case of FIG. 2, the frequency demodulated luminance signal has noises removed therefrom with the coefficient $\alpha$ set for of a coefficient integrating circuit 22 by means of the correlation detection circuit 17.

Further, a reproduced chrominance signal is separated by an LPF 5 from the reproduced composite signal. The separated chrominance signal is in a low-band converted state as mentioned in the foregoing. Therefore, the chrominance signal is processed back into a normal chrominance signal in the same manner as in the case of FIG. 2. The chrominance signal then undergoes a band restricting process performed by a BPF 12 before it comes to a color difference signal demodulation circuit 27.

Further, like in the case of the first embodiment described in the foregoing, a reference signal fc which is produced from a reference signal generating circuit 15 is supplied to an APC circuit 13 as a signal of the same frequency as the subcarrier, which is 3.58 MHz if it corresponds to a television signal of the NTSC system.

In the chrominance signal supplied to the color difference signal demodulation circuit 27, color difference signals R-Y and B-Y are quadrature two-phase modulated with the subcarrier fsc. Therefore, the chrominance signal is thus demodulated into a base-band signal which carries no information by its phase with the signal demodulated into the color difference signals R-Y and B-Y at the color difference signal demodulation circuit 27.

A noise removing operation on the color difference signals R Y and B-Y is performed as follows:

The signal R-Y demodulated and obtained from the chrominance signal is supplied to subtracters 28a and 28b. A portion of the signal R-Y obtained one H before is also supplied to the subtracter 28a together with the present portion of the signal R-Y. The subtracter 28a produces a difference signal representing a difference between the present portion of signal R-Y and the previous portion of signal R-Y. The difference signal is supplied to a coefficient integrating circuit 30. The circuit 30 is arranged, like the coefficient integrating circuit 22, to integrate the incoming difference signal with a coefficient $\beta$ ($0 \leq \beta \leq 1$). The difference signal integrated with the coefficient $\beta$ is supplied to the other subtracter 28b. The subtracter 28b removes a noise component by subtracting the difference signal multiplied by the coefficient $\beta$ from the present portion of signal R-Y. The signal R-Y is then supplied to the chrominance signal modulation circuit 34 and also to a 1-H delay circuit 29. Following that, the above stated operation is likewise performed on a portion of the signal R-Y next coming to the subtracter 28a.

As for the other color difference signal B-Y, subtracters 31a and 31b, a coefficient integrating circuit 32 which integrates the signal with a coefficient $\gamma$ ($0 \leq \gamma \leq 1$) and a 1-H delay circuit 33 are arranged to remove a noise from the signal B-Y by subtracting therefrom a difference signal multiplied $\gamma$ times in a manner similar to the signal R-Y. The signal B-Y is then supplied to the chrominance signal modulation circuit 34.

With the chrominance signal demodulated into the color difference signals R-Y and B-Y which are base-band signals and with the coefficients $\beta$ and $\gamma$ suitably set at the coefficient integrating circuits 29 and 32, for example, according to the correlativity of the signals R-Y and B-Y, noises are removable from the color difference signals R-Y and B-Y in the same manner as in the case of the noise removing operation performed for the luminance signal as described in the foregoing with reference to FIG. 2. Therefore, the chrominance signal obtained by the chrominance signal modulation circuit 34 from these noiseless color difference signals is free from any noise component. The chrominance signal from the circuit 34 is supplied to a mixer 20 to be multiplexed with the luminance signal from which a noise component has been removed in the above stated manner. The mixer 20 thus produces an outgoing reproduced composite video signal including no noise component therein.

In the second embodiment shown in FIG. 4, the coefficients $\beta$ and $\gamma$ to be used at the coefficient integrating circuits 29 and 32 are set according to the intensity of the correlativity of the luminance signal as determined by the correlation detection circuit 17. This is because the intensity of correlation of the signals R-Y and B-Y can be considered corresponding to that of the correlation of the luminance signal. The coefficients are thus set at values closer to $\beta=1$ and $\gamma=1$ according as the correlation of the luminance signal is stronger and closer to $\beta=0$ and $\gamma=0$ according as it is weaker. The coefficients are set at $\beta=0$ and $\gamma=0$ in case that the luminance signal has no correlation at all.

With their noises removed in the same manner as the luminance signal by using the coefficients $\beta$ and $\gamma$ which are thus set according to the correlation of the luminance signal, the color difference signals R-Y and B-Y are supplied to the chrominance signal modulation circuit 34 to be modulated there back into the original form of the chrominance signal. The chrominance signal thus obtained is multiplexed with the luminance signal at the mixer 20. The mixer 20 then produces an outgoing reproduced composite signal. As shown in FIG. 4, the correlation detection circuit is provided only for the reproduced luminance signal and is arranged to detect the correlation of the luminance signal. The coefficients of the coefficient integrating circuits are set at values according to the detected correlation. This arrangement obviates the necessity of providing the apparatus with correlation detection circuits for the color difference signals R-Y and B-Y, because: Noises occur mostly in the stage of the composite signal during reproduction. The correlativities of the luminance signal and the signals R-Y and B-Y which are separated from the same composite signal trend similarly to each other. Therefore, it suffices to detect the correlativity of only one of these signals and to set the same coefficient for all of them. The arrangement of this embodiment to remove noise components from these signals under the same noise removing characteristic thus not only permits simplification of the apparatus but also effectively prevents color deviation from occurring during the process of signal reproduction. While the correlation detection circuit is provided in the case of FIG. 4 for the luminance signal which more easily permits detection of correlation than other signals, it may be provided either for the signal R-Y or the signal B-Y instead of the luminance signal. Further, in the second embodiment, the noise removing process is arranged to be performed with the 1-H delay circuit on the assumption that a signal portion obtained one H before is most closely correlated to the present signal portion because of the nature of the video signal. However, the use of the 1-H delay circuit may be changed to a one-field or one-frame period delay circuit or, for more accurate removal of noises, may be changed to the use of a field or frame memory or the like. Further, the arrangement of this embodiment to effect noise removal after demodulating the chrominance signal into color difference signals may be changed in some different manner. For example, the noise removal may be effected after demodulating the chrominance signal into three primary color signals R, G and B or some other base-band signals.

Figure 5:
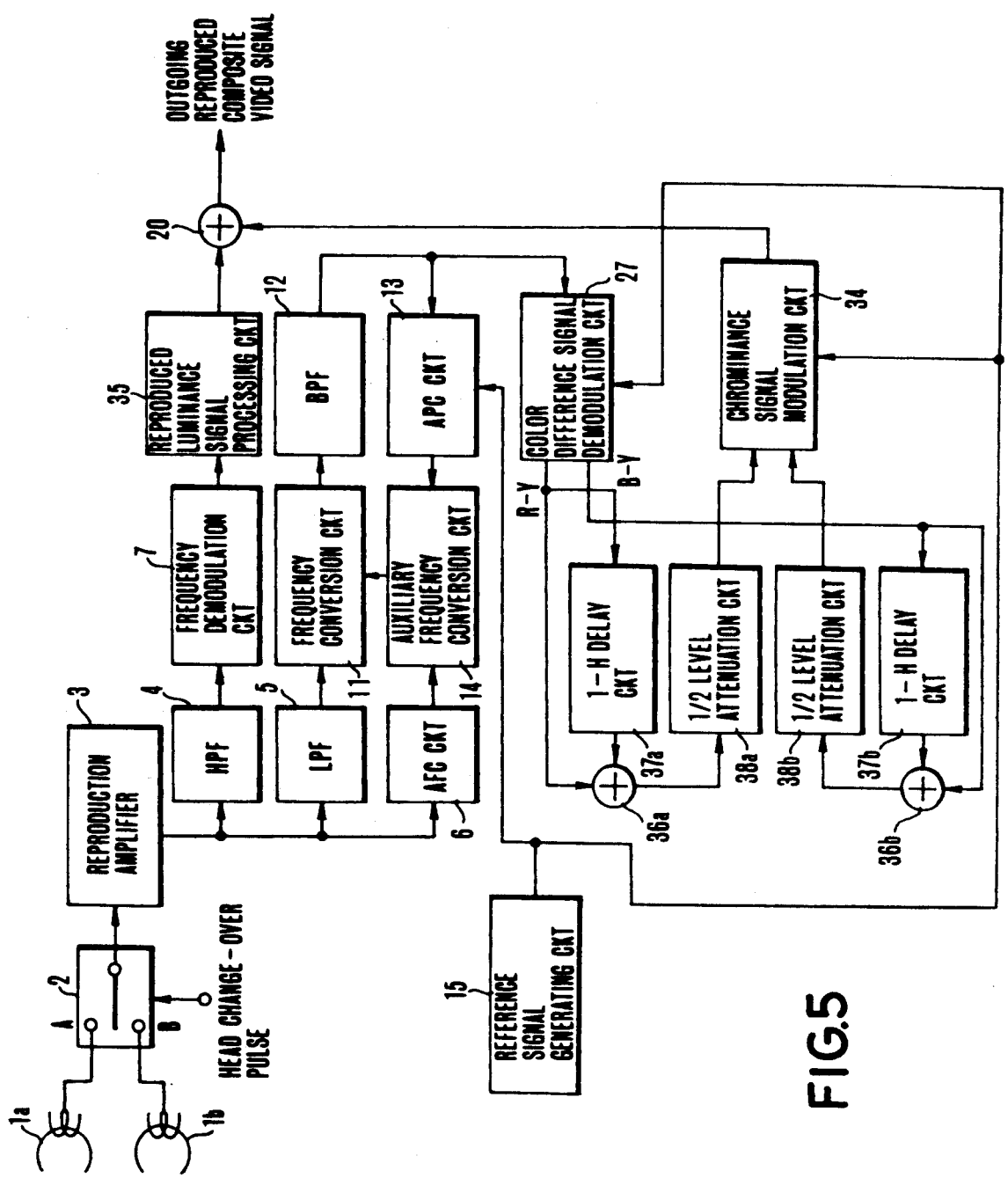
FIG. 5 is a block diagram showing in outline a VTR which is provided with a noise removing circuit and is arranged as a third embodiment of this invention.

FIG. 5 shows in outline the arrangement of a VTR equipped with a noise removing circuit arranged as a third embodiment of this invention. In FIG. 5, the parts similar to those shown in FIG. 2 is indicated by the same reference numerals. Rotary magnetic heads 1a and 1b are arranged to reproduce a composite signal from a magnetic tape which is not shown. A luminance signal is separated from the reproduced composite signal by an HPF 4 and is frequency demodulated by a frequency demodulation circuit 7. The demodulated luminance signal then undergoes a noise removing process which is carried out at a reproduced luminance signal processing circuit 35 in the same manner as in the case of FIG. 2. The noise removed luminance signal is supplied to a decoder 20. Meanwhile, a low-band converted chrominance signal is separated from the reproduced composite signal by an LPF 5. The low-band converted chrominance signal is supplied to a color difference signal demodulation circuit 27 which performs the same process as in the case of FIG. 4 to give color difference signals R-Y and B-Y. The signals R-Y and B-Y are supplied to adders 36a and 36b and 1-H delay circuits 37a and 37b. Each of the adders 36a and 36b are arranged to receive also a portion of the signal R-Y or B-Y which has been obtained one horizontal scanning period before and delayed one horizontal scanning period. The previous portions of the signals R-Y and B-Y are respectively added to the present portions of the signals R-Y and B-Y. The outputs of the adders 36a and 36b are then attenuated to a ½ level by the level attenuation circuits 38a and 38b. Through this process, the stronger correlativity parts of the present and 1-H period preceding portions of these signals which represent information signals keep their levels unchanged while weak correlativity parts which represent noise components have their levels attenuated. As a result of this attenuation process, the noise components of the signals R-Y and B-Y are removed.

The color difference signals from which the noise components have been removed in the above stated manner are brought back into the original form of the chrominance signal by a chrominance signal modulation circuit 34 in the same manner as in the case of FIG. 4. Following that, the chrominance signal and the above stated luminance signal are multiplexed together and are produced from a mixer 20 as a reproduced composite video signal.

The third embodiment is thus arranged to convert a reproduced chrominance signal into color difference signals which keep their information fairly impervious to phase variations, so that use of delay circuits becomes possible to facilitate noise removal with regard to chrominance information.

Figure 6:
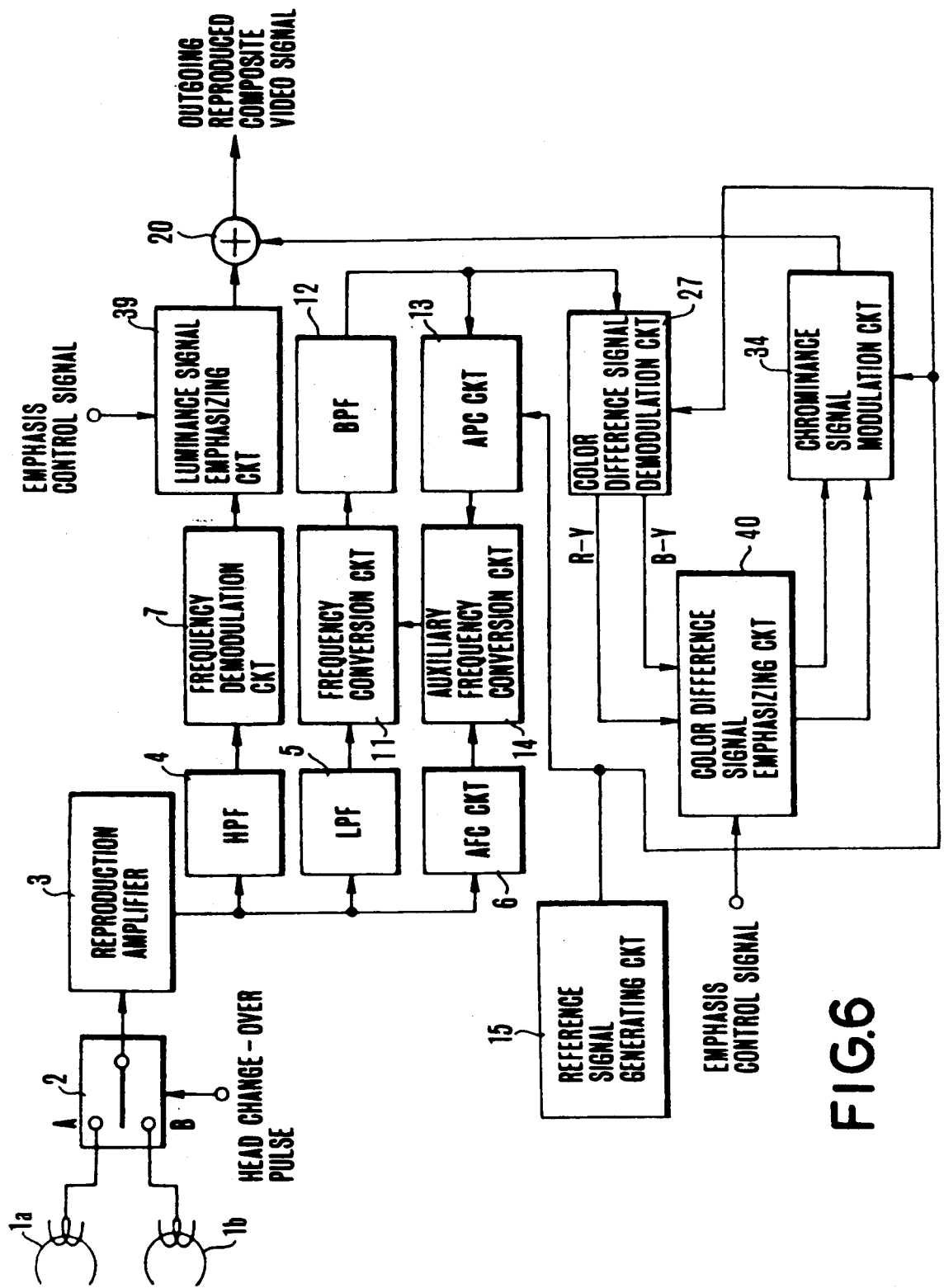
FIG. 6 is a diagram showing in outline a VTR which is provided with a circuit arranged to emphasize the edge parts of a reproduced chrominance signal and is arranged as a fourth embodiment of this invention.

FIG. 6 shows in outline a VTR equipped with a circuit arranged as a fourth embodiment of this invention to emphasize the edge parts of a reproduced chrominance signal. In FIG. 6, the parts similar to those of FIG. 1 are indicated by the same reference numerals. A reproduced composite signal obtained by means of rotary magnetic heads 1a and 1b from a magnetic tape which is not shown has a reproduced luminance signal separated therefrom by means of an HPF 4. The luminance signal is then frequency demodulated by a frequency demodulation circuit 7. A luminance signal emphasizing circuit 39 emphasizes the edge parts of the reproduced luminance signal under the control of an emphasis control signal. After that, the reproduced luminance signal is supplied to a decoder 20.

Meanwhile, a low-band converted chrominance signal is separated from the reproduced composite signal by means of an LPF 5. The chrominance signal is supplied to a color difference signal demodulation circuit 27 to be processed there in the same manner as in the case of FIG. 4. Then, color difference signals R-Y and B-Y which are thus obtained are supplied to a color difference signal emphasizing circuit 40. The circuit 40 is arranged to emphasize a part of the color difference signal corresponding to an edge part of an image at which the color difference signal abruptly changes. The emphasizing degree of the luminance signal emphasizing circuit 39 and that of the color difference signal emphasizing circuit 40 are arranged to be controllable with an emphasis control signal adjusted by operating a volume or the like which is not shown. After this process, a color bleeding or blurred state of the edge parts of an image is adjustable by means of the above stated volume.

With the color difference signal parts corresponding to the edge parts of an image thus emphasized in the above stated manner, the color difference signals are brought back into the form of the original chrominance signal by the chrominance signal modulation circuit 34. The chrominance signal and the luminance signal are then multiplexed together at a mixer 20 to be produced as an outgoing reproduced composite video signal.

As described above, the fourth embodiment of this invention is capable of adequately emphasizing the parts of the chrominance signal corresponding to the edge parts of an image without being affected by any phase variations by virtue of the arrangement to demodulate the reproduced chrominance signal into color difference signals which are fairly impervious to phase variations.

Figure 7:
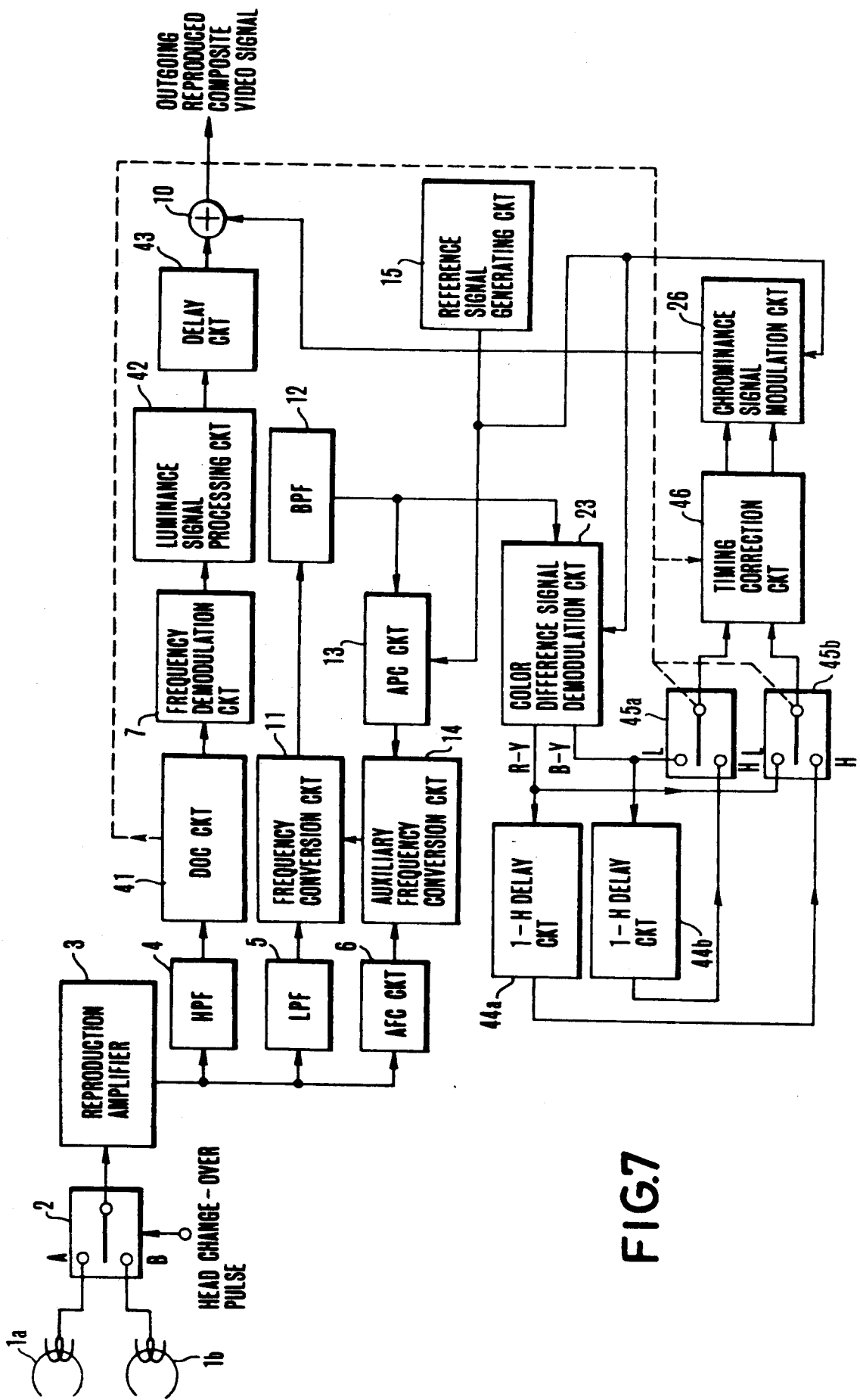
FIG. 7 is a diagram showing in outline the arrangement of the reproduction system of a VTR which is provided with a drop-out compensation circuit and is arranged as a fifth embodiment of this invention.

FIG. 7 shows in outline the reproduction system of a VTR which is equipped with a drop-out compensation circuit and is arranged as a fifth embodiment of this invention. The parts of FIG. 7 which are similar to those shown in FIG. 3 are indicated by the same reference numerals and the details of them are omitted from the following description: A reproduced composite signal is obtained by means of rotary magnetic heads 1a and 1b from a magnetic tape which is not shown. The reproduced composite signal is supplied via a change-over switch 2 to a reproduction amplifier 3. The signal thus amplified is supplied to an HPF 4, an LPF 5 and an AFC circuit 6. At the HPF 4, a frequency modulated luminance signal which is distributed on a high frequency band side within the reproduced composite signal is separated from the composite signal. The separated luminance signal is supplied to a drop-out cancel circuit 41 (hereinafter referred to as DOC circuit). At the DOC circuit 41, the luminance signal which is in a frequency modulated state is examined for any drop-out. In the event of detection of a drop-out in the luminance signal, the drop-out part is interpolated by carrying out a compensating process with a 1-H period delay line in the manner similar to the process described in the foregoing. If no drop-out is detected, the luminance signal is demodulated by the frequency demodulation circuit 7 without any compensating process and is subjected to a signal processing operation including noise removing and emphasizing processes, etc. The processed luminance signal is supplied to a mixer 10 after it is delayed a given period of time by a delay circuit 43. Meanwhile, a low-band converted chrominance signal which is located on a low-band side within the reproduced composite signal is separated by an LPF 5. The chrominance signal is then converted back to a normal chrominance signal by a frequency conversion circuit 11 in the same manner as in the case of the preceding examples of embodiment described in the foregoing. The chrominance signal produced from the frequency conversion circuit 11 is supplied to a color difference signal demodulation circuit 23 via a BPF 12 which performs a band restricting action on the chrominance signal.

The color difference signal demodulation circuit 23 which receives also a reference signal fc from a reference signal generating circuit 15 converts the chrominance signal into color difference signals R-Y and B-Y. The signals R-Y and B-Y are then supplied to 1-H delay circuits 44a and 44b and change-over switches 45a and 45b respectively. The connecting positions of the change-over switches 45a and 45b are normally on their sides L and are arranged to supply the color difference signals to a timing correction circuit 46. The timing correction circuit 46 is arranged to correct a temporal error of the signals R-Y and B-Y relative to each other.

The timing correction circuit 46 is composed of, for example, a fixed delay line and a variable delay line. The fixed delay line is arranged to delay the color difference signals for matching them at the mixer 10 with the luminance signal which is delayed by the delay circuit 43. The variable delay line is arranged to have normally about the same delay time as the fixed delay line. The color difference signals R-Y and B-Y which come via the changeover switches 45a and 45b are thus delayed by the timing correction circuit 46. After that, a chrominance signal modulation circuit 26 forms a chrominance signal by using the color difference signals. The chrominance signal is then supplied to the mixer 10 to be multiplexed together with the luminance signal. The mixer 10 then produces an outgoing reproduced composite video signal.

In the event of occurrence of a drop-out, a DOC circuit 41 which is arranged to monitor the envelope of a signal detects an abrupt level change in the reproduced luminance signal separated by the HPF 4 from the reproduced composite signal. In that event, a drop-out is determined to have occurred. Then, in the same manner as described in the foregoing, a drop-out compensating action is performed on the luminance signal and, at the same time, high level change-over pulses are produced to each of the change-over switches 45a and 45b and the timing correction circuit 46 until the abrupt level change comes to disappear from the envelope. Then, the connecting positions of the change-over switches 45a and 45b shift to and stay on their sides H as long as the high level change-over pulses continue to come. The change-over switches 45a and 45b thus produce (color difference) signal portions which are obtained one H period before and delayed for one H (horizontal scanning) period by the 1-H delay circuits 44a and 44b. As a result, the signal having the drop-out is interpolated with the signal portion obtained one H period before.

As described above, the drop-out compensating process is carried out by using the (color difference) signal portions delayed by two 1-H delay circuits 44a and 44b. However, the delay time of one delay circuit does not always coincide with that of the other delay circuit. If a difference occurs in the delay time between the 1-H delay circuits 44a and 44b, there would result a temporal deviation in the drop-out compensated portions of the color difference signals R-Y and B-Y. In that event, use of these signals as they are tends to cause some deterioration such as color deviation in the chrominance signal generated by the chrominance signal modulation circuit 26. To solve this problem, therefore, the embodiment is arranged to correct the timing of the color difference signals R-Y and B-Y before converting the color difference signals into the chrominance signal at the chrominance signal modulation circuit 26. This arrangement effectively prevents the chrominance signal from having such deterioration as color deviation.

If the delay time of the 1-H delay circuit 44b is longer than that of the 1-H delay circuit 44a, the fixed delay line of timing correction circuit 46 delays the signal R-Y which is delayed by the 1-H delay circuit 44a for a predetermined length of time while the variable delay line of the timing correction circuit 46 delays the signal B-Y which is delayed by the 1-H delay circuit 44b. The delay time of the variable delay line is set according to the degree of precision of the 1-H delay circuits 44a and 44b at such a value that, in the event of a drop-out, the signals R-Y and B-Y coming to the 1-H delay circuits 44a and 44b are concurrently produced from the timing correction circuit 46. For this purpose, the variable delay line is arranged within the timing correction circuit 46 to have its delay time controlled by a change-over pulse signal produced from the DOC circuit 41. While the time delayed by the variable delay line is normally the same as the delay time by the fixed delay line, the delay time of the variable delay line is thus switched over to a delay time for a drop-out when a drop-out occurs. This corrects any timing deviation between the color difference signals R-Y and B-Y by correcting a delay time difference between the 1-H delay circuits 44a and 44b before they are supplied to the chrominance signal modulation circuit 26.

The chrominance signal modulation circuit 26 then generates a chrominance signal by using the color difference signals thus obtained. The chrominance signal is supplied to the mixer 10. The mixer 10 multiplexes the luminance and chrominance signals to produce therefrom an outgoing reproduced video signal.

As described in the foregoing, the drop-out compensating operation can be easily accomplished even on the reproduced chrominance signal as well as the luminance signal by converting the chrominance signal into color difference signals which are not readily affected by phase variations in terms of color information. Further, the possible deterioration of color information due to the use of delay circuits is held to a minimal degree by correcting the timing of signals, so that the color or luminance information can be reproduced with fidelity even in the event of occurrence of a drop-out.

In the case of this embodiment, occurrence of a drop-out is detected solely for the reproduced luminance signal by means of the drop-out cancel circuit. Then, while the drop-out compensating action is performed on the luminance signal accordingly, the drop-out compensating action is accomplished also on the color difference signals R-Y and B-Y through the 1-H delay circuits 44a and 44b. This arrangement of the embodiment solves the problems arising from arranging drop-out detection circuits separately for the reproduced luminance signal and the color difference signals R-Y and B-Y. More specifically, in the case of an arrangement to have the drop-out detection circuits separately for these signals and to have the delay circuits for these detection circuits discretely controlled, a signal which has undergone a drop-out correcting process and another signal which has not undergone any drop-out correcting process might concurrently occur, because a drop-out might not be detectable by all the detection circuits due to a faulty operation of some of the detection circuits, etc. Under such a condition, phases of signals would come to deviate excessively from each other for matching them with each other. Then, the phase deviation would result in the deterioration of the outgoing reproduced video signal. In case that the drop-out detection circuits are to be provided for all the signal components, the above stated problem can be solved by arranging control pulses to be produced for causing a drop-out correcting process to be performed when any of these drop-out detection circuits detects a drop-out.

Further, in this specific embodiment, drop-out compensation is arranged to be carried out by using the 1-H delay circuits on the assumption that a signal portion obtained one horizontal scanning period before has the highest degree of correlativity to the present signal portion. However, this arrangement may be changed to use one-field or one-frame period delay circuits or, for higher picture quality after drop-out compensation, to perform control according to the correlativity of image signals in relation to the extent of delay to be effected by these delay circuits.

Further, this embodiment is arranged to make drop-out compensation by demodulating and converting the chrominance signal into color difference signals. However, that arrangement of course may be replaced with any suitable arrangement. For example, the drop-out compensation may be made by converting the chrominance signal into signals R, G and B or some other base-band signal.

As described in the foregoing, the various correcting processes on the reproduced chrominance signal are carried out through base-band signals such as the color difference signals. Therefore, unlike a case where such correcting processes directly on the chrominance signal, this invention permits these correcting processes to be easily and reliably accomplished without necessitating any arrangement for preventing phase deviation and impairment of continuity of the subcarrier fsc. Further, since various correcting processes are arranged to be performed through such base-band signals as the color difference signals and to modulate and convert them back to the chrominance signal, drop-out compensation, noise removal, edge emphasizing and other correcting processes on a color or chrominance information signal can be accomplished without impairing the signal phase and the subcarrier fsc.

Further, as mentioned in the foregoing description of various embodiments, the frequency of the subcarrier fsc which is used in frequency converting the reproduced low band converted chrominance signal is used also in converting the chrominance signal into the color difference signals and in converting the color difference signals back to the chrominance signal. This arrangement of the invention enables one and the same reference signal generator to be used for various purposes, so that the apparatus can be arranged in a simpler manner. The invention thus permits reduction in size and cost of the apparatus.

While each of the embodiments described is arranged to perform various correcting processes by demodulating and converting the chrominance signal into color difference signals. This invention is not limited to that arrangement. It goes without saying that the various correcting processes may be likewise accomplished by demodulating and converting the chrominance signal into some other base-band signals such as R, G and B signals.

In the case of each embodiment described, this invention is applied to a VTR. However, the invention is not limited to the VTR but is also applicable to the reproducing apparatuses of different kinds, such as the reproducing system of a video disc apparatus.

What is claimed is:

1. A video signal reproducing apparatus for reproducing a composite video signal from a record bearing medium on which the composite video signal is recorded, said composite video signal being formed, from a color video signal including at least a luminance signal and a chrominance signal, by frequency-modulating said luminance signal, frequency-converting said chrominance signal into a signal having a lower frequency band than its original frequency band and then frequency-multiplexing the both signals, comprising:
   (a) reproducing means for reproducing said composite video signal from said record bearing medium;
   (b) separating means for separating the frequency-modulated luminance signal and the frequency-converted chrominance signal from said composite video signal reproduced by said reproducing means outputting the separated signals, respectively;
   (c) demodulating means for demodulating the frequency-converted chrominance signal outputted from said separating means into a plurality of different base-band signals and for outputting these signals, respectively; and
   (d) drop-out compensating means for applying drop-out compensation to said plurality of different base-band signals outputted from said demodulating means.

2. An apparatus according to claim 1, further comprising modulating means for modulating said plurality of different base-band signals, to which the drop-out compensation has been applied by said drop-out compensating means, to the chrominance signals and outputting the modulated signals.

3. A video signal reproducing apparatus for reproducing a composite video signal from a record bearing medium on which the composite video signal is recorded, said composite video signal being formed, from a color video signal including at least a luminance signal and a chrominance signal, by frequency-modulating said luminance signal, frequency-converting said chrominance signal into a signal having a lower frequency band than its original frequency band and then frequency-multiplexing the both signals, comprising:
   (a) reproducing means for reproducing said composite video signal from said record bearing medium;
   (b) separating means for separating the frequency-modulated luminance signal and the frequency-converted chrominance signal from said composite video signal reproduced by said reproducing means and outputting the separated signals, respectively;
   (c) signal forming means for forming a plurality of different base-band signals, by using the frequency-converted chrominance signal outputted from said separating means, and for outputting these signals;
   (d) drop-out detecting means for detecting occurrence of a drop-out in the frequency-modulated luminance signal outputted from said separating means; and
   (e) drop-out compensating means for applying drop-out compensation to said plurality of different base-band signals outputted from said signal forming means, in accordance with a result of detection effected by said drop-out detecting means.

4. A video signal reproducing apparatus for reproducing a composite video signal from a record bearing medium on which the composite video signal is recorded, said composite video signal being formed, from a color video signal including at least a luminance signal and a chrominance signal, by frequency-modulating said luminance signal, frequency-converting said chrominance signal into a signal having a lower frequency band than its original frequency band and then frequency-multiplexing the both signals, comprising:
   (a) reproducing means for reproducing said composite video from said record bearing medium;
   (b) separating means for separating the frequency-modulated luminance signal and the frequency-converted chrominance signal from said composite video signal reproduced by said reproducing means and outputting the separated signals, respectively;
   (c) signal forming means for forming a plurality of different base-band signals, by using the frequency-converted chrominance signal outputted from said separating means;
   (d) first drop-out compensating means for detecting occurrence of a drop-out in the frequency-modulated luminance signal outputted from said separating means, to output a drop-out detecting signal and for applying drop-out compensation to the frequency-modulated luminance signal; and
   (e) second drop-out compensating means for applying drop-out compensation to said plurality of base-band signals, in accordance with input timing of the drop-out detecting signal outputted from said first drop-out compensating means.

* * * * *